US008083510B2

(12) United States Patent
Hensley et al.

(10) Patent No.: US 8,083,510 B2
(45) Date of Patent: Dec. 27, 2011

(54) CONCRETE FINISHING MACHINE

(75) Inventors: Jason Hensley, Shakopee, MN (US); Thomas Kuckhahn, Prior Lake, MN (US); Michael LeJeune, Wayzata, MN (US); Richard Wesen, Chisago City, MN (US); Gregory Morford, Minneapolis, MN (US); Patrick Heman, Longdale, MN (US); Mark Yzermans, Cottage Grove, MN (US); David Henderson, Rochester, MN (US)

(73) Assignee: Fabcon, Inc., Savage, MN (US)

( * ) Notice: Subject to any disclaimer, the term of this patent is extended or adjusted under 35 U.S.C. 154(b) by 0 days.

(21) Appl. No.: 11/521,019

(22) Filed: Sep. 14, 2006

(65) Prior Publication Data

US 2008/0069917 A1 Mar. 20, 2008

(51) Int. Cl.
*B28B 1/14* (2006.01)
*B23K 26/02* (2006.01)

(52) U.S. Cl. ........ 425/150; 425/149; 425/167; 425/169; 425/359; 425/360; 425/375; 425/415; 249/102; 359/622

(58) Field of Classification Search .................. 425/150, 425/261, 353, 354, 375, 447, 357, 163, 167, 425/173, 149, 169, 359, 360, 410, 413–416, 425/445, 446; 264/40.5, 40.7, 333; 249/74, 249/140, 102–104; 356/622
See application file for complete search history.

(56) References Cited

U.S. PATENT DOCUMENTS 2,857,858 A * 10/1958 Guggenheim et al. ........ 425/177
2,875,499 A * 3/1959 Ross ............................ 425/162
3,009,400 A * 11/1961 Gerber et al. ................ 404/119
3,129,462 A * 4/1964 Borah ........................... 425/351
3,517,424 A * 6/1970 Larson et al. ................ 425/167
3,523,343 A * 8/1970 Mitchell ......................... 425/88
3,659,077 A * 4/1972 Olson ............................ 219/213
3,900,279 A 8/1975 Newby
3,921,786 A * 11/1975 Hejmanowski .......... 198/370.07
3,969,056 A * 7/1976 Larsen et al. ................ 425/218
3,974,872 A * 8/1976 Buhrer ............................ 164/40
4,168,140 A * 9/1979 Fontana et al. ............... 425/228
4,369,153 A 1/1983 Nash et al. ...................... 264/62
4,457,682 A 7/1984 Nash et al. .................... 425/219
4,492,552 A * 1/1985 Murakami et al. ............ 425/218
4,738,605 A * 4/1988 Aerts et al. ...................... 425/98
4,978,246 A * 12/1990 Quenzi et al. ................ 404/84.5
5,202,132 A * 4/1993 Myers et al. ..................... 425/62
5,318,426 A 6/1994 Hanson et al. .................. 425/64
5,429,490 A * 7/1995 Myers et al. ............. 425/436 R
6,442,447 B1 * 8/2002 Gross ............................ 700/189
6,779,175 B2 * 8/2004 Susnjara ....................... 717/136
6,793,476 B2 * 9/2004 Bryja et al. ................... 425/145
6,803,002 B2 * 10/2004 Suto et al. ..................... 264/162
6,841,110 B2 * 1/2005 Seppanen et al. ............. 264/229
6,923,630 B2 * 8/2005 Allen .............................. 425/63
7,044,681 B2 * 5/2006 Quenzi et al. ................ 404/84.1
7,191,999 B2 * 3/2007 Hensley et al. ............... 249/155
2004/0004303 A1 * 1/2004 Iskra ............................ 264/109
2008/0044509 A1 * 2/2008 Hensley et al. ............... 425/169

* cited by examiner

*Primary Examiner* — Joseph Del Sole
*Assistant Examiner* — Dimple Bodawala
(74) *Attorney, Agent, or Firm* — Vidas, Arrett & Steinkraus

(57) ABSTRACT

A machine for imprinting patterns onto uncured concrete in an elongated bed includes a frame for positioning the finishing machine over the bed. A lower patterning unit suspended from the frame is movable backward and forward of the concrete bed and a press assembly moves the pattern in and out of contact with uncured concrete on the elongated bed.

1 Claim, 8 Drawing Sheets

CONCRETE FINISHING MACHINE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to a concrete finishing machine for use in concrete casting system. Such casting systems typically have either a moving bed or a fixed bed on which the concrete panels or planks are formed. In the moving bed systems, a long bed moves on a track past each of the various stations that form the panels. See for example, U.S. Pat. No. 4,369,153. In a fixed bed, the various stations themselves move, such as a hopper that pours concrete onto the bed.

Prior art approaches have used hand laid patterns which are very labor intensive. Very simple longitudinal ribbing is relatively easy to accomplish as shown in U.S. Pat. No. 4,457,682. Brick imprinting on surfaces has been tried with a number of different approaches, including U.S. Pat. No. 5,318,426 which is commonly owned, the disclosure of which is incorporated herein by reference.

The existing machine approaches allow either brick imprinting or raking to be laid down as patterns. It is very desirable to be able to produce panels that have a variety of patterns on them, such as a lower brick imprint with a raked section above the bricks, or rakes with gaps in the raking or bands in addition to longitudinal raking.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

The invention provides a concrete finishing machine which may be positioned over a casting bed, whether fixed or movable. The description herein will refer to use with a moving bed, but the finishing machine may be readily used in a fixed bed system by simply moving the finishing machine as with all other components of such systems.

The concrete finishing machine is described in conjunction with an automated system for casting concrete. However, the advantages of the finishing machine are also obtained on non-automated casting systems.

Typically, an entire casting bed will have a detailed drawing, often on CAD (Computer Assisted Drafting) which shows the workers where each feature throughout the bed must be placed. This involves giving each of the plant workers the required prints of the bed to be cast so they know exactly where each feature must be added.

It is also very desirable in either system to be able to accurately and easy imprint the upper surface of the still uncured concrete with a variety of patterns, such as a simulated brick or raked lines for surface decorations. Tying in with the CAD drawings and the position of the bed with a concrete finishing machine ensures that imprinted patterning may be accurately made with a minimum of cost and personnel.

This disclosure shows an automated system for casting concrete panels which takes CAD drawings for a casting bed that covers the features throughout the length of the bed and accurately projects a laser generated image of the drawings over the bed at the exact location corresponding to the CAD drawings. This enables the workers to perform whatever functions are needed at that location on the bed, such as placement of lifting lug points, openings, insulation, and surface finishes.

An automated system utilizes laser projectors such as those available from LAP GmbH Laser Applikationen of Lueneburg, Germany in combination with its CAD drawings and a positioning system on its concrete casting bed to relate the precise position on the casting bed to the CAD which is tied to the laser projector. This allows the CAD drawings to be projected onto the casting bed as a visible drawing representation such that the workers can immediately see precisely where each and every feature to be included in the concrete which they are about to cast.

The finishing machine of the invention is situated over the casting bed and includes a readily changeable lower pattern unit attached to a press assembly. The press assembly is carried on a framework that allows it to be moved up and down in order for the pattern unit to impress its pattern into the uncured concrete. It also includes tracks and actuators to allow the unit to move back and forth relative to the length of the casting bed such that the pattern may be applied, lifted, moved to the next position and then be applied again.

The finishing machine includes distance measuring sensors which detects the height of the concrete surface relative to the machine in order to automatically adjust the patterning to the desired depth, even as the concrete below has minor alterations in thickness.

BRIEF DESCRIPTION OF THE DRAWINGS

A detailed description of the invention is hereafter described with specific reference being made to the drawings in which.

DETAILED DESCRIPTION OF THE INVENTION

Figure 1:
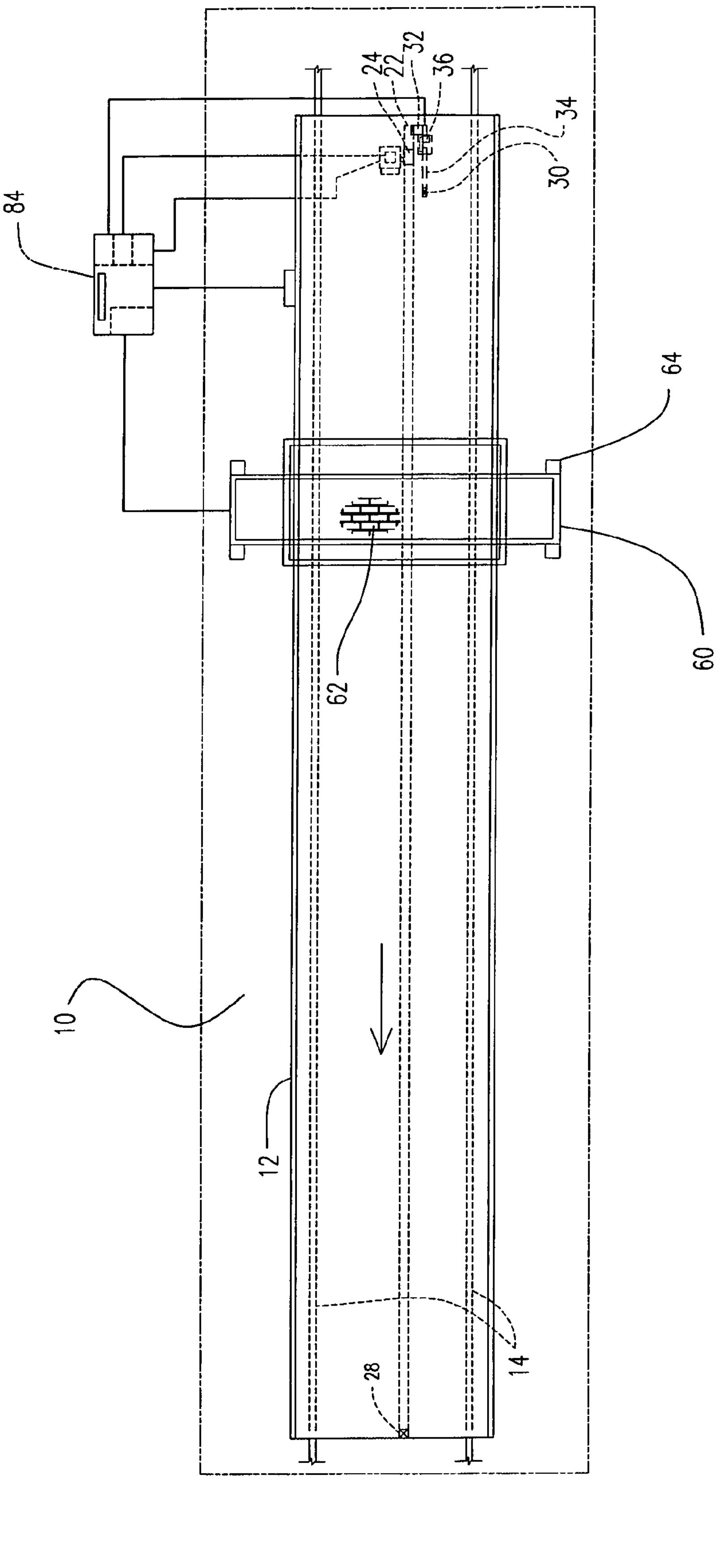
FIG. 1 is a top view of the finishing machine over a concrete casting bed.

With reference to FIG. 1, the form of the finishing machine used in connection with a moving casting bed 10 is employed is shown. Moving casting beds 10 are well known in the art, and typically include a concrete form 12 that may be 900 feet long. The bed 10 has tracks 14 that ride on rails such that the entire bed 10 may be moved down the rails. This allows the bed 10 to be moved to each of the fixed stations, such as for pouring concrete on the bed from an overhead hopper.

Figure 2:
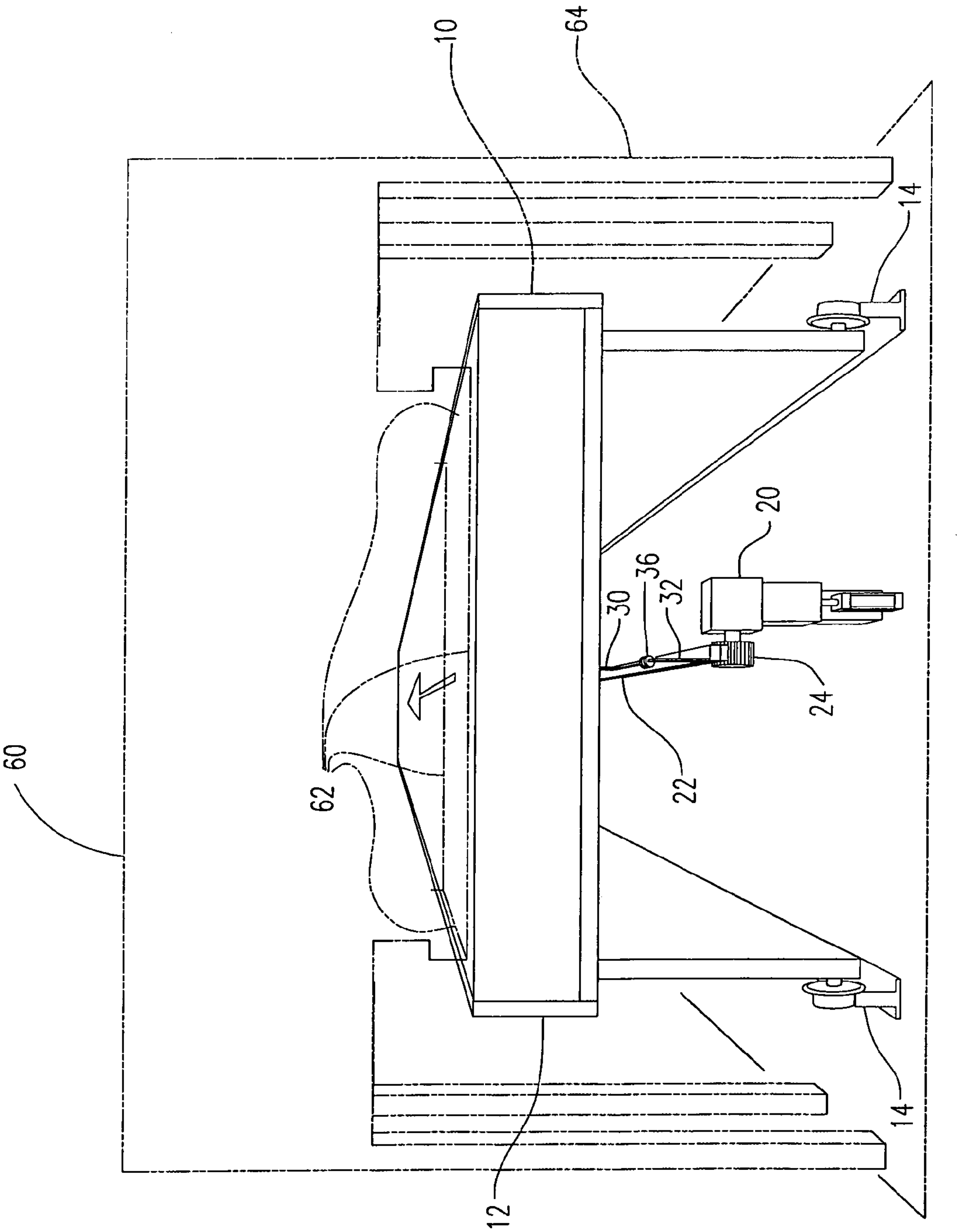
FIG. 2 is an end, partially perspective view showing the finishing machine over a moving bed.
Figure 3:
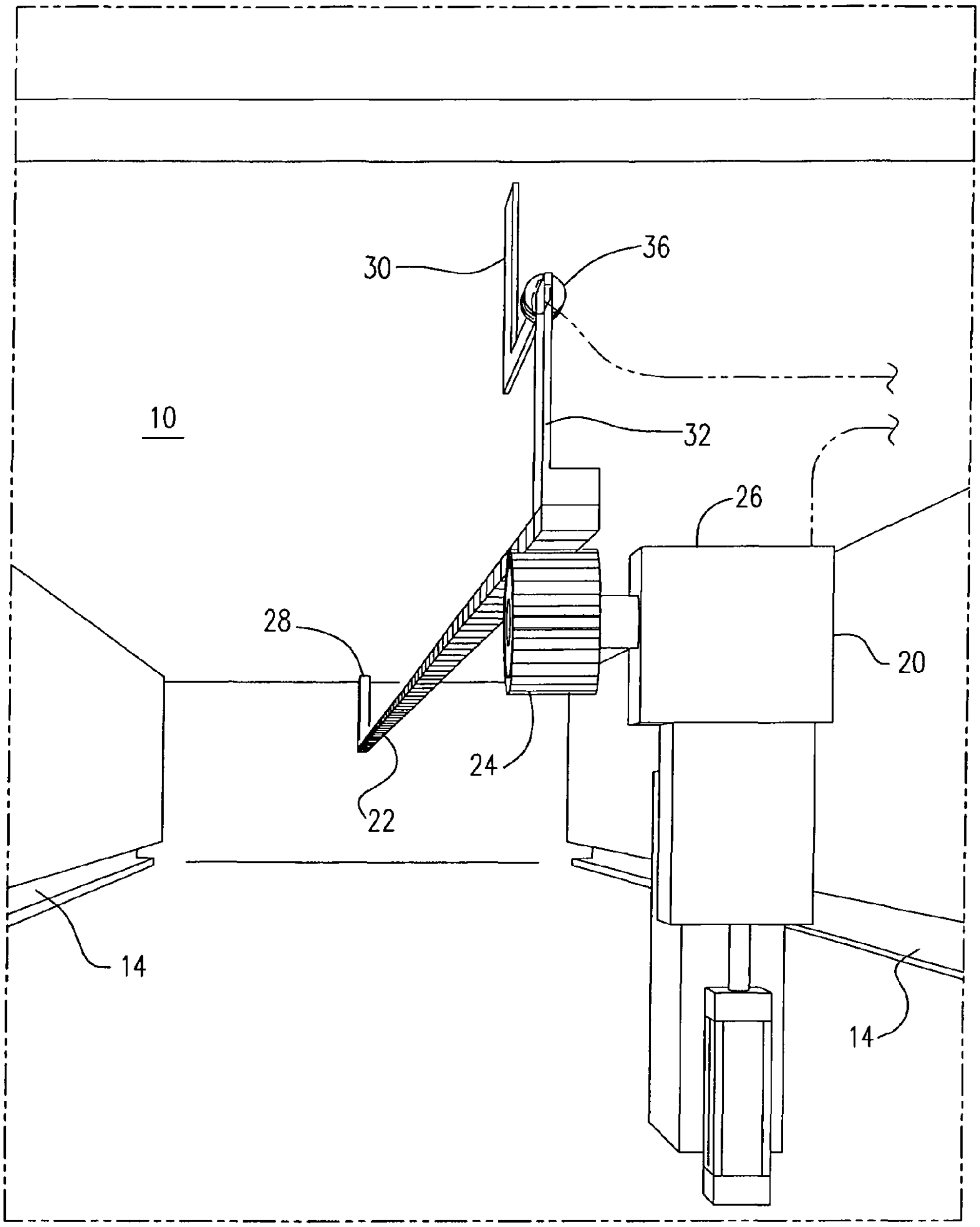
FIG. 3 is an end view showing a bed positioning mechanism.
Figure 4:
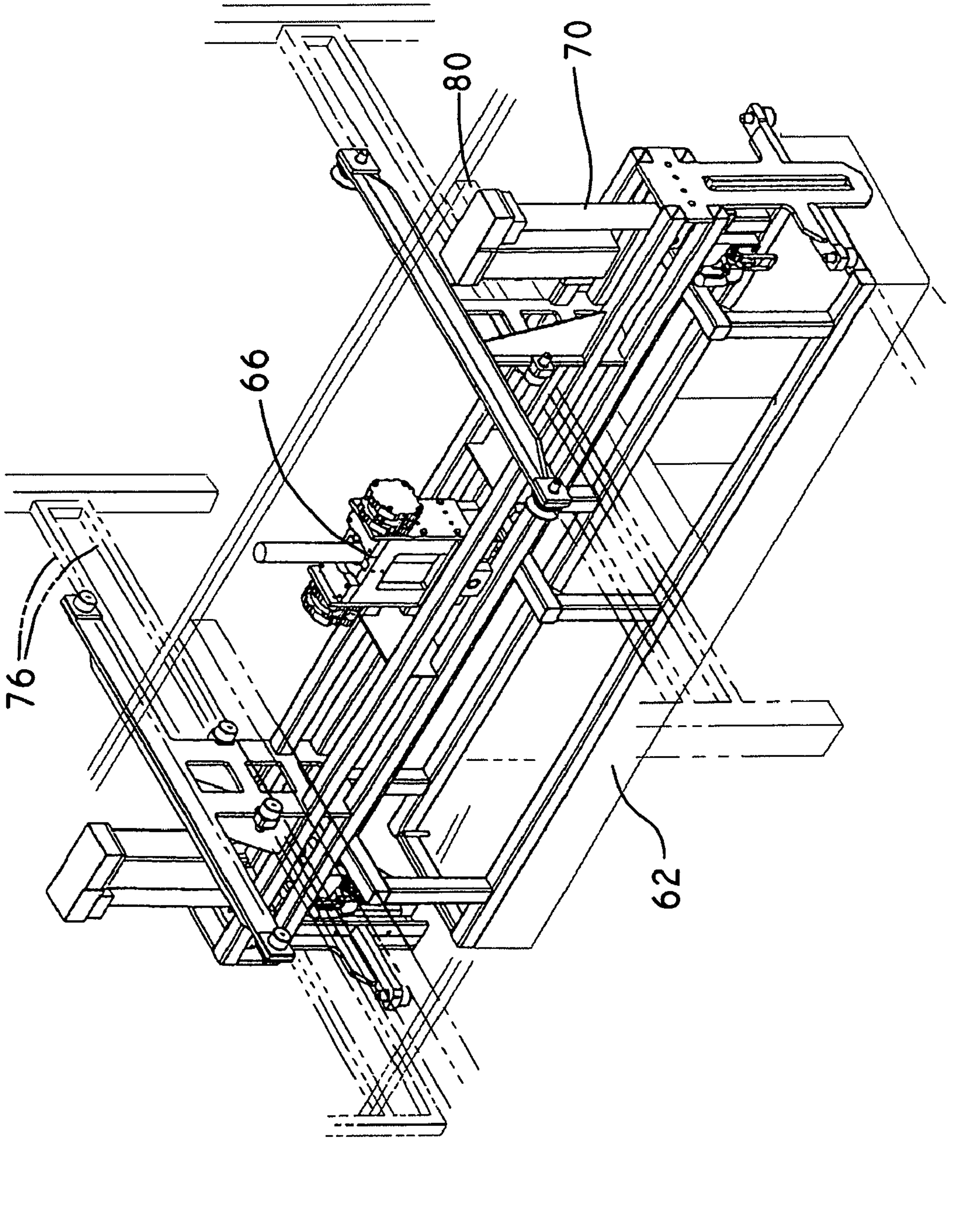
FIG. 4 is a partial perspective view of the finishing machine.
Figure 5:
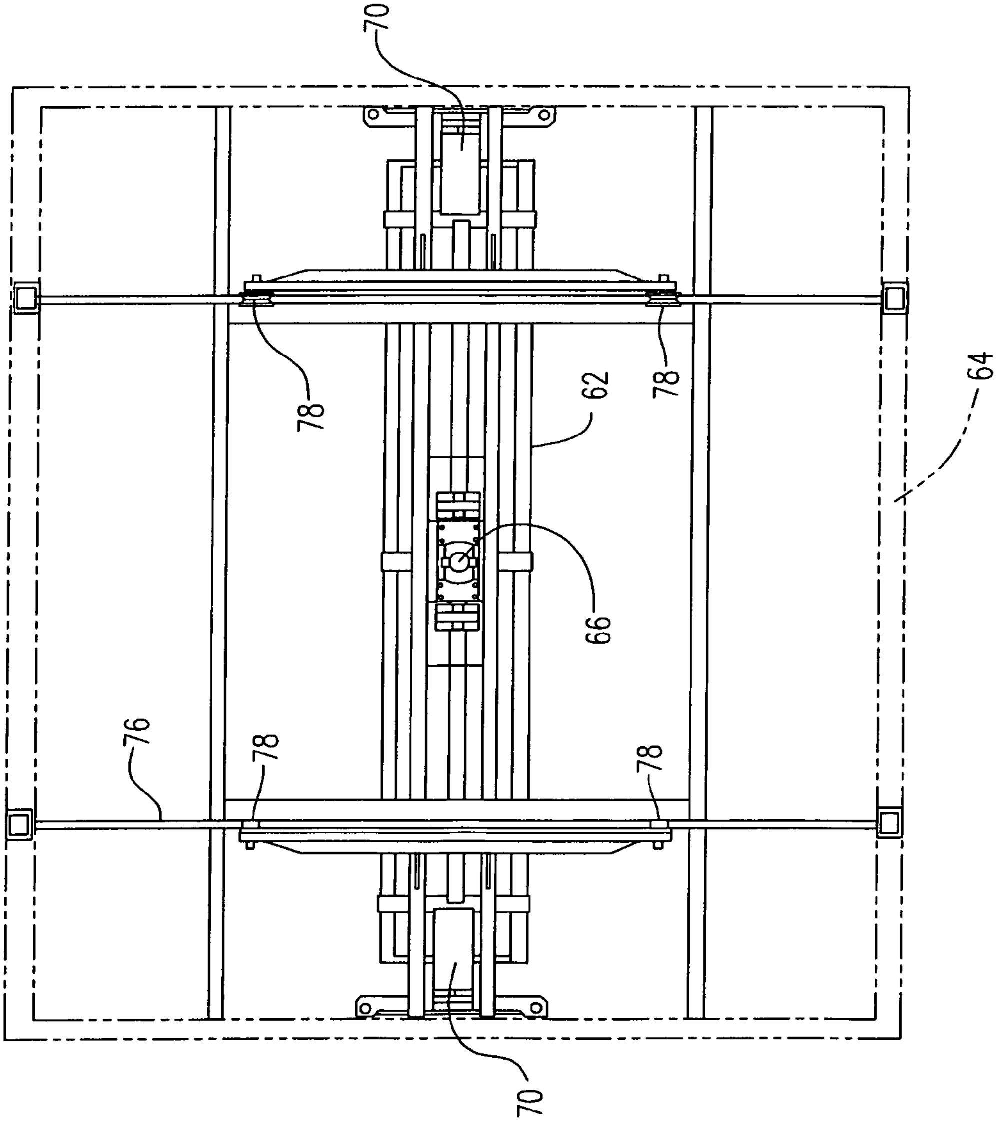
FIG. 5 is a top view of the finishing machine.

The underside of a typical casting bed 10 is shown in FIGS. 2-4 in which it will be seen that a mechanism to precisely indicate the exact position on the bed 10 may be generated. The bed position device 20 is used to provide a signal that indicates the exact position of the bed to a known position in the plant. As shown, it involves the addition of a rack 22 to the underside of the casting bed 10. The rack 22 engages with a pinion 24 which is attached to an encoder 26. The rack 22 has a fixed rack anchor 28. The bed 10 includes a bed fixture bracket 30 which together with a linear decoder post 32 and a vemeer code readable scale 34 and linear encoded track monitor 36 is able to accurately gauge and report any differences in length of the bed due to tension of the prestressing cables or temperature changes. This allows variations in the casting bed 10 length to be accounted for due to seasonal temperature changes, and stress changes due to prestressing in the bed which over a very long casting bed 10 can be significant. The fixed encoder 26 is fed the bed length information and transmits the exact position on the bed as read by the rack 22.

FIGS. 1 and 2 show a finishing machine 60 over the bed that can apply rake finishes, brick imprints or any other surface patterning desired. FIG. 2 shows a surface finishing machine 60 situated over casting bed 10. It carries a lower fragmentary pattern unit 62 which may receive information from a control station 84 which may receive bed position information, any temperature compensation and information on the CAD drawing requirements and imprints the uncured concrete surface accordingly. Alternatively, the pattern unit may be manually operated or may simply receive position information without a tie-in to CAD drawings and a laser projection system. The lower pattern unit 62 is readily removable such that another unit with a different pattern may be attached. Thus, the bed may be imprinted exactly where needed, to the depth needed with whatever patterns are desired, from varying brick patterns to rake finishes and the like.

Figure 6:
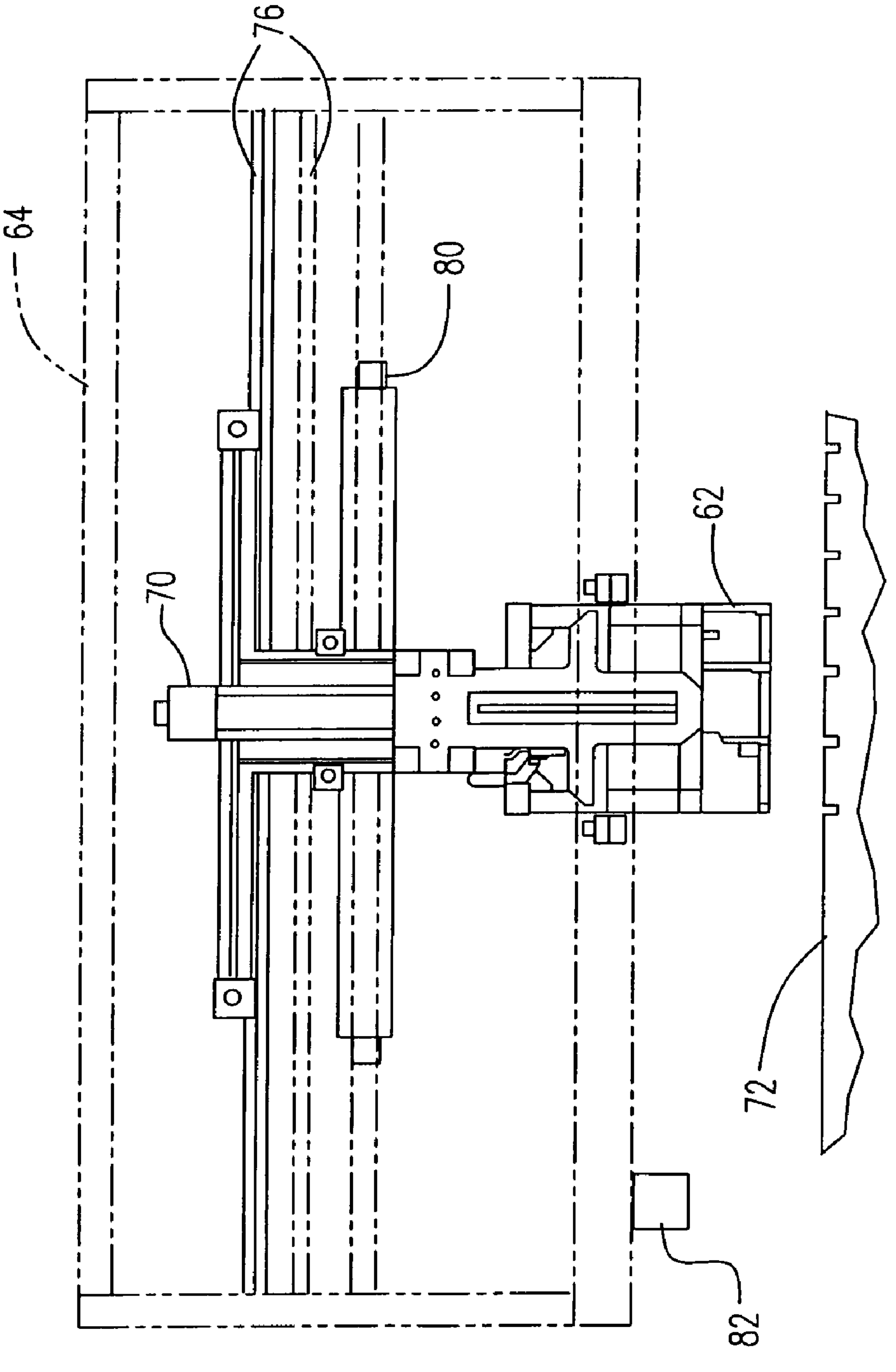
FIG. 6 is a side view of the finishing machine showing the press patterning.
Figure 7:
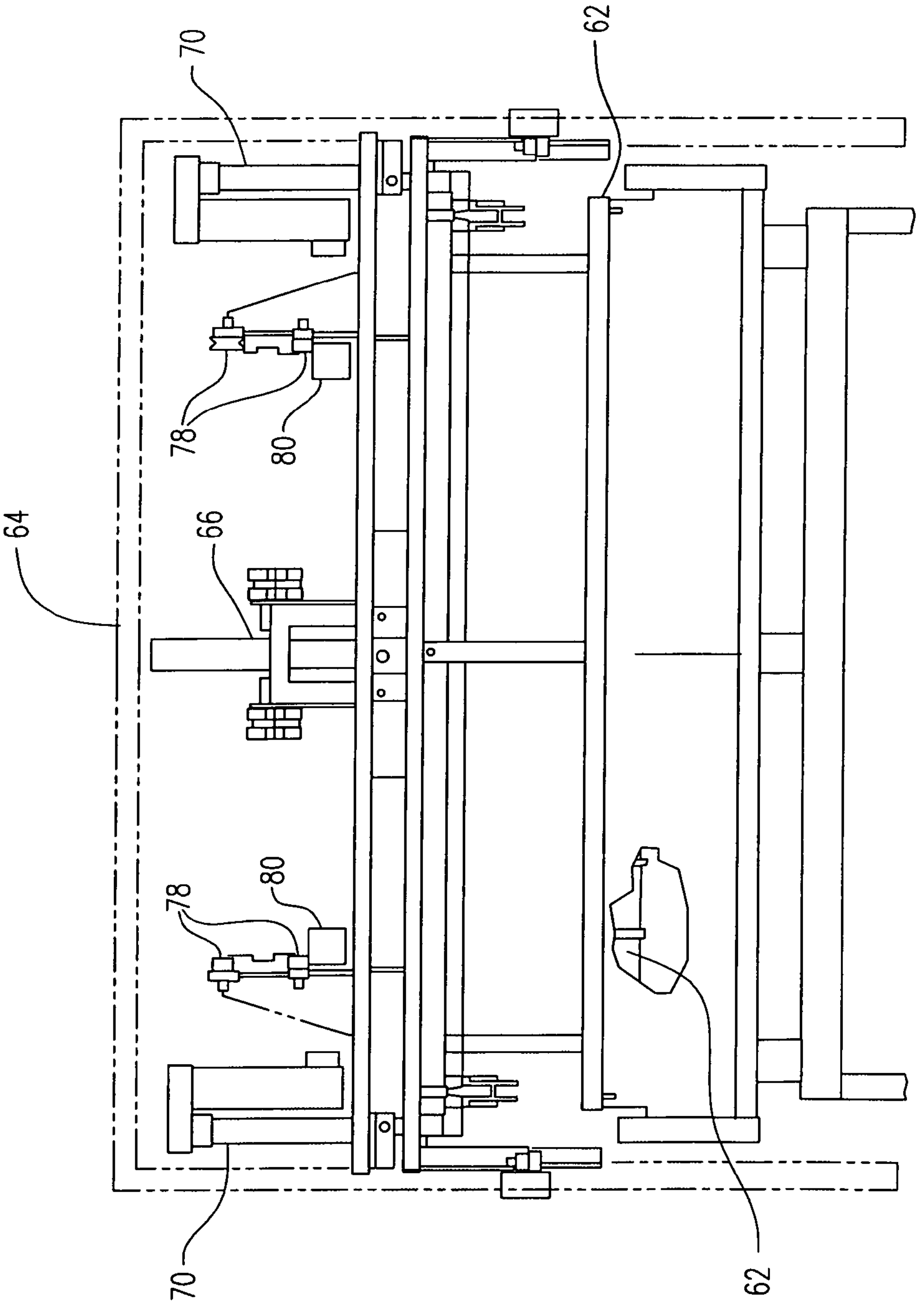
FIG. 7 is an end view of the finishing machine showing the press.
Figure 8:
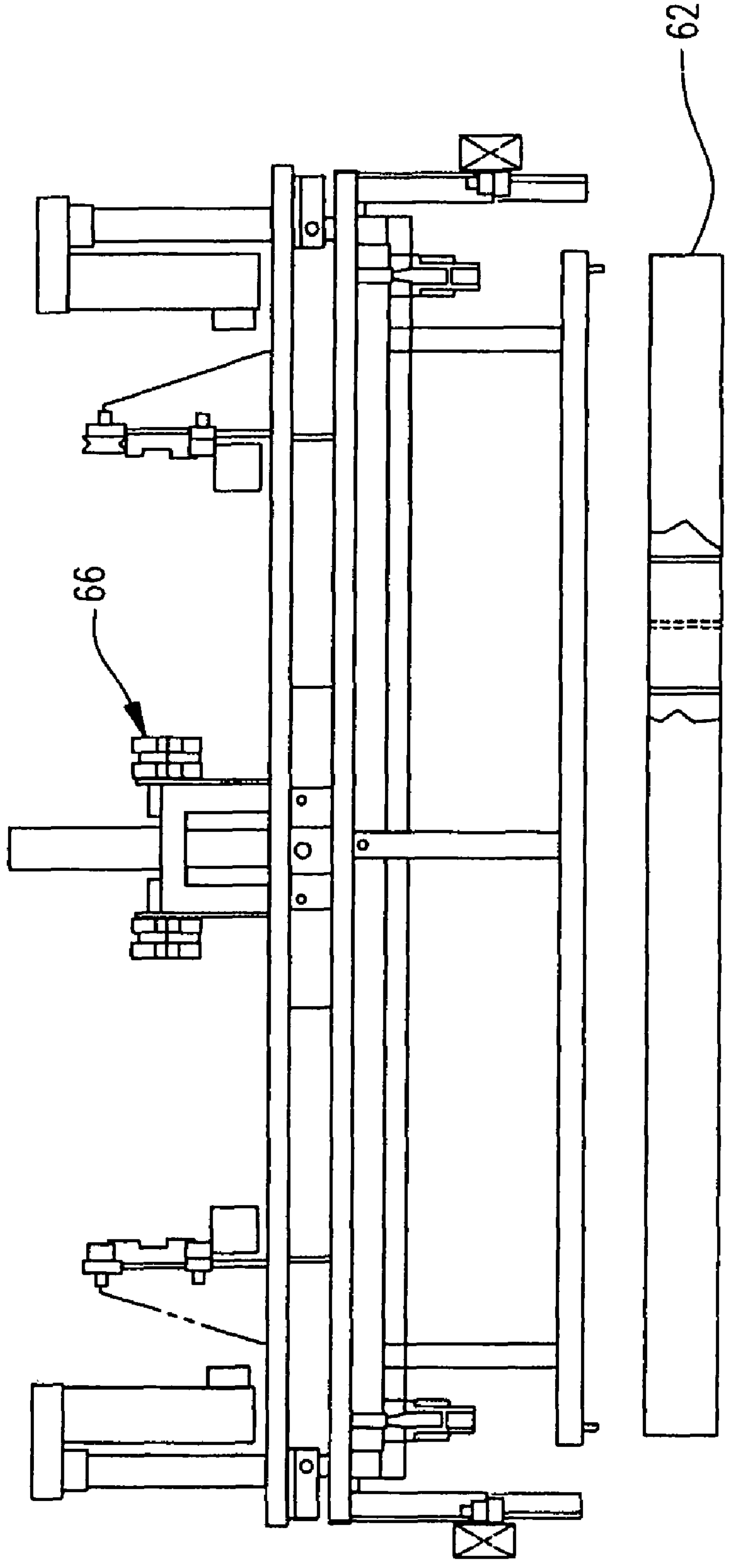
FIG. 8 is an end view showing the press pattern detached.

As best shown in FIGS. 4-8, the finishing machine 60 includes a frame 64, which in the case of a moving bed 10 positions the machine 60 over the bed without contact. A press assembly 66 carries the lower pattern unit 62 which may be readily swapped out with a different pattern. The press assembly 66 is raised and lowered by vertical actuators 70 which are controlled to imprint the pattern to the desired depth on the uncured concrete surface 72. The entire press assembly 66 may move lengthwise with relation to the bed 10 by virtue of tandem linear tracks 76 to which it is mounted by rollers 78. The side view of FIG. 6 shows that the press assembly 66 is able to move back and forth along the direction of the casting bed 10 by virtue of the tandem tracks 76 via linear actuators 80.

Distance measuring sensors 82 as shown in FIG. 6 may be advantageously employed to detect the distance between a fixed known position and the upper surface 72 of the concrete below the sensor. When the distance varies, it means that the thickness of the uncured concrete has varied slightly. With this information, the depth of the pattern may be kept constant by automatically adjusting the depth the lower patterning unit 62 descends to by the press assembly 66. Otherwise, the finished pattern could be too deep or too shallow and the aesthetics of the design could be less than optimal. The distance measuring sensors 82 may be the widely available laser emitters which are used to measure distance and which distance information can be fed to the machine in order to adjust the depth of the pattern as to concrete depth varies.

A control station 84 is connected to finishing machine 60 and bed positioning device 20. Thus, the information on the exact bed position relative to the finishing machine may be transmitted and the press assembly may be controlled accordingly.

The invention has been shown in the figures in connection with a moving casting bed. The invention is also usable in fixed bed casting, in which the bed is stationary but the various components used in making the concrete panels move about the bed. The laser would simply be on a track above and along the entire length of the bed. The bed positioning device would also be above the bed and relative to the moving components, such as the concrete hopper, etc. The finishing machine would then be mounted to be movable along the length of the casting bed.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A concrete finishing machine comprising:

(a) a frame to position said machine above an elongated concrete casting bed without contacting said casting bed;

(b) a press assembly movably attached to said frame, said press assembly including linear and vertical control members to move said press assembly up and down and back and forth;

(c) a press pattern securable to said press assembly such that a pattern may be imprinted into uncured concrete below said press pattern when said press assembly moves downwardly; and (d) control device for controlling the up and down and back and forth movement of said press assembly along linear tracks said control device in communication with a bed positioning device that includes a toothed rack along the length of said casting bed, said rack engages with a pinion attached to an encoder for transmitting the position of said casting bed relative to the press assembly to the control device.

* * * * *